(12) United States Patent
Witney et al.

(10) Patent No.: US 9,969,000 B2
(45) Date of Patent: May 15, 2018

(54) ADDITIVE MANUFACTURING OF JOINING PREFORMS

(71) Applicant: General Electric Company, Schenectady, NY (US)

(72) Inventors: Andrew Batton Witney, Schenectady, NY (US); Jeffrey Michael Breznak, Waterford, NY (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 14/794,712

(22) Filed: Jul. 8, 2015

(65) Prior Publication Data

US 2017/0008084 A1    Jan. 12, 2017

(51) Int. Cl.
| | | |
|---|---|---|
| *B22F 3/105* | (2006.01) | |
| *B22F 5/10* | (2006.01) | |
| *B22F 7/06* | (2006.01) | |
| *B23K 35/02* | (2006.01) | |
| *B23K 26/342* | (2014.01) | |

(Continued)

(52) U.S. Cl.
CPC .............. *B22F 3/1055* (2013.01); *B22F 5/10* (2013.01); *B22F 7/06* (2013.01); *B23K 26/0081* (2013.01); *B23K 26/342* (2015.10); *B23K 35/0222* (2013.01); *B23K 35/0238* (2013.01); *B23K 35/0244* (2013.01); *B23K 35/262* (2013.01); *B23K 35/302* (2013.01); *B23K 35/3006* (2013.01); *B23K 35/3013* (2013.01); *B23K 35/3033* (2013.01); *B23K 35/362* (2013.01); *B23K 35/3603* (2013.01); *B23K 35/3605* (2013.01); *B23K 35/3606* (2013.01); *B23K 35/3611* (2013.01); *B22F 5/009* (2013.01);

(Continued)

(58) Field of Classification Search
None
See application file for complete search history.

(56) References Cited

U.S. PATENT DOCUMENTS

| 7,837,087 B2 | 11/2010 | Breznak et al. |
|---|---|---|
| 8,448,839 B1 | 5/2013 | Rakozy et al. |

(Continued)

FOREIGN PATENT DOCUMENTS

FR    2978070 A1    1/2013

OTHER PUBLICATIONS

European Search Report and Opinion issued in connection with corresponding EP Application No. 16177522.6 dated Nov. 17, 2016.

*Primary Examiner* — Jessee R Roe
*Assistant Examiner* — Ngoclan T Mai
(74) *Attorney, Agent, or Firm* — James W. Pemrick; Ernest G. Cusick; Frank A. Landgraff (57) ABSTRACT

A method of fabricating a joining preform includes the step of printing a self-fluxing joining alloy. Joining includes brazing and soldering. The self-fluxing joining alloy contains at least one of phosphorus, boron, fluorine, chlorine, or potassium. Another printing step prints a non-phosphorous joining alloy. Both printing steps are performed by an additive manufacturing or 3D printing process. The printing a self-fluxing joining alloy step may be repeated until the non-phosphorous joining alloy is substantially encapsulated by the self-fluxing joining alloy. The self-fluxing joining alloy may be a BCuP alloy, a CuP alloy, a CuSnP alloy, a CuSnNiP alloy or a CuAgP alloy. The non-phosphorous joining alloy may be a BAg alloy, a BNi alloy or a BAu alloy.

20 Claims, 6 Drawing Sheets (51) Int. Cl.
*B23K 26/00* (2014.01)
*B23K 35/26* (2006.01)
*B23K 35/30* (2006.01)
*B23K 35/36* (2006.01)
*B23K 35/362* (2006.01)
*B22F 5/00* (2006.01)
*B33Y 10/00* (2015.01)

(52) U.S. Cl.
CPC ........... *B22F 2999/00* (2013.01); *B33Y 10/00* (2014.12); *Y02P 10/295* (2015.11)

(56) References Cited

U.S. PATENT DOCUMENTS

| | | | |
|---|---|---|---|
| 2004/0164059 A1* | 8/2004 | Brehm | B23K 1/0056 219/121.64 |
| 2006/0108355 A1 | 5/2006 | Breznak et al. | |
| 2013/0020378 A1* | 1/2013 | Harris | B23K 1/0008 228/194 |
| 2014/0033523 A1 | 2/2014 | Rakozy et al. | |
| 2015/0068629 A1 | 3/2015 | Kottilingam et al. | |
| 2016/0175934 A1* | 6/2016 | Lacy | B22F 3/1055 428/172 |
| 2016/0354842 A1* | 12/2016 | Schick | B22F 7/06 |

\* cited by examiner

ADDITIVE MANUFACTURING OF JOINING PREFORMS

BACKGROUND OF THE INVENTION

The invention described herein relates generally to joining. More specifically, the invention relates to a method of printing soldering and brazing preforms using additive manufacturing.

The stator windings in large generators may be water-cooled. The armature windings comprise an arrangement of half coils or stator bars (collectively referred to as "stator bars" or "bars") connected at each end through copper or stainless steel fittings and water-cooled connections to form continuous hydraulic winding circuits. Water-cooled armature winding bars are comprised of a plurality of small rectangular solid and hollow copper strands arranged to form a bar. The rectangular copper strands are generally arranged in rectangular bundles. The hollow strands each have an internal duct for conducting coolant through the bar. The ends of the strands are each brazed to a respective hydraulic header clip. The hydraulic header clip serves as both an electrical and a cooling flow connection for the armature winding bar.

The hydraulic header clip is a hollow connector that includes an enclosed chamber for ingress or egress of a cooling liquid, typically deionized water. At one open end, the clip encloses the ends of the copper strands of the armature winding bar. A braze alloy bonds the end sections of the strands to each other and to the hydraulic header clip. The braze joints between adjacent strand ends and between the strand ends and the clip should retain hydraulic and electrical integrity for the expected lifetime of the winding. A typical life time of a winding is on the order of tens of years.

Internal surfaces of the brazed joints between the clip and the ends of the strands are constantly exposed to the deionized, oxygenated water flowing through the clip and the hollow strands. In addition, many other liquid filled conduits incorporate brazed joints exposed to water, such as phase leads, series loops, connection rings, bushings, as well as the many fittings needed to connect these conduits. The exposure of the brazed surfaces to the coolant/water can result in corrosion of conduits. Certain conditions promote crevice corrosion in the braze joints, such as: phosphorus, corrosive flux residues, copper, suitable corrosion initiation sites and water.

The corrosion process can initiate if the braze joint surfaces contain surface crevices, pinholes, or porosity at or near the surface of the joint and the critical water chemistry conditions that support corrosion. The corrosion process can progress through the braze joints especially when critical crevice geometry and water chemistry conditions exist. Porosity within the braze joints can accelerate corrosion. If allowed to progress through a joint, corrosion will eventually result in a water leak through the entire effective braze joint length and compromise the hydraulic integrity of the liquid filled conduits. Accordingly, there is a need for a corrosion-resistant brazed joint. The benefits of a corrosion-resistant brazed joint are expected to include improved generator availability and generator reliability.

Additive manufacturing processes, for example, may generally involve the buildup of one or more materials to make a net or near net shape object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model. One exemplary additive manufacturing process uses an energy beam, for example, an electron beam or electromagnetic radiation such as a laser beam, to fuse (e.g., sinter or melt) a powder material, creating a solid three-dimensional object in which particles of the powder material are bonded together. Different material systems, for example, engineering plastics, thermoplastic elastomers, metals, and ceramics may be used. Laser sintering or melting is one exemplary additive manufacturing process for rapid fabrication of functional prototypes and tools.

Laser sintering can refer to producing three-dimensional (3D) objects by using a laser beam to sinter or melt a fine powder. Specifically, sintering can entail agglomerating particles of a powder at a temperature below the melting point of the powder material, whereas melting can entail fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate, and the effects of processing parameters on the microstructural evolution during the layer manufacturing process can lead to a variety of production considerations. For example, this method of fabrication may be accompanied by multiple modes of heat, mass and momentum transfer, and chemical reactions.

Laser sintering/melting techniques can specifically entail projecting a laser beam onto a controlled amount of powder material (e.g., a powder metal material) on a substrate (e.g., build plate) so as to form a layer of fused particles or molten material thereon. By moving the laser beam relative to the substrate along a predetermined path, often referred to as a scan pattern, the layer can be defined in two dimensions on the substrate (e.g., the "x" and "y" directions), the height or thickness of the layer (e.g., the "z" direction) being determined in part by the laser beam and powder material parameters. Scan patterns can comprise parallel scan lines, also referred to as scan vectors or hatch lines, and the distance between two adjacent scan lines may be referred to as hatch spacing, which may be less than the diameter of the laser beam or melt pool so as to achieve sufficient overlap to ensure complete sintering or melting of the powder material. Repeating the movement of the laser along all or part of a scan pattern may facilitate further layers of material to be deposited and then sintered or melted, thereby fabricating a three-dimensional object.

For example, laser sintering and melting techniques can include using continuous wave (CW) lasers, such as Nd:YAG lasers operating at or about 1064 nm. Such embodiments may facilitate relatively high material deposition rates particularly suited for repair applications or where a subsequent machining operation is acceptable in order to achieve a finished object. Other laser sintering and melting techniques may alternatively or additionally be utilized such as, for example, pulsed lasers, different types of lasers, different power/wavelength parameters, different powder materials or various scan patterns to facilitate the production of one or more three-dimensional objects.

BRIEF DESCRIPTION OF THE INVENTION

In an aspect of the present invention, a method of fabricating a joining, brazing or soldering preform includes a printing step that prints a self-fluxing joining alloy. The self-fluxing joining, brazing or soldering alloy contains at least one of phosphorus, boron, fluorine, chlorine, or potassium. Another printing step prints a non-phosphorous joining alloy. A repeating step repeats the printing a self-fluxing joining alloy step until the non-phosphorous joining alloy is substantially encapsulated by the self-fluxing joining alloy. Both printing steps are performed by an additive manufacturing process.

In another aspect of the present invention, a method of fabricating a joining preform includes a printing step that prints a non-phosphorous joining alloy. Another printing step prints a self-fluxing joining alloy on the non-phosphorous joining alloy. The self-fluxing joining alloy contains at least one of phosphorus, boron, fluorine, chlorine, or potassium. Both printing steps are performed by an additive manufacturing process.

In yet another aspect of the present invention, a method of fabricating a brazing preform includes a printing step that prints a self-fluxing braze alloy. The self-fluxing braze alloy contains phosphorus. As examples, the self-fluxing braze alloy is at least one of a BCuP alloy, a CuP alloy, a CuSnP alloy, a CuSnNiP alloy or a CuAgP alloy. Another printing step prints a non-phosphorous braze alloy which is a is a BAg alloy. A repeating step repeats the printing a self-fluxing braze alloy step until the non-phosphorous braze alloy is substantially encapsulated by the self-fluxing braze alloy. Both printing steps are performed by an additive manufacturing process, and the brazing preform is formed into at least one of a cylinder, a disc, a sheet or a washer. The method may be used to print the self-fluxing braze alloy on a part to be brazed. The printing a self-fluxing braze alloy step may be used to print multiple layers of the self-fluxing braze alloy, where each of the multiple layers has a different percentage of phosphorus. The multiple layers may have a plurality of inner layers and a plurality of outer layers, and the outer layers have a different percentage of phosphorus than the inner layers, and the outer layers have a different melting point than the inner layers.

DETAILED DESCRIPTION OF THE INVENTION

One or more specific aspects of the present invention will be described below. In an effort to provide a concise description of these aspects, all features of an actual implementation may not be described in the specification. It should be appreciated that in the development of any such actual implementation, as in any engineering project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of planning, fabrication, and manufacture for those of ordinary skill having the benefit of this disclosure.

When introducing elements of various aspects of the present invention, the articles "a", "an", and "the" are intended to mean that there are one or more of the elements. The terms "comprising," "including," and "having" are intended to be inclusive and mean that there may be additional elements other than the listed elements. Any examples of operating parameters, materials and/or environmental conditions are not exclusive of other parameters/materials/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
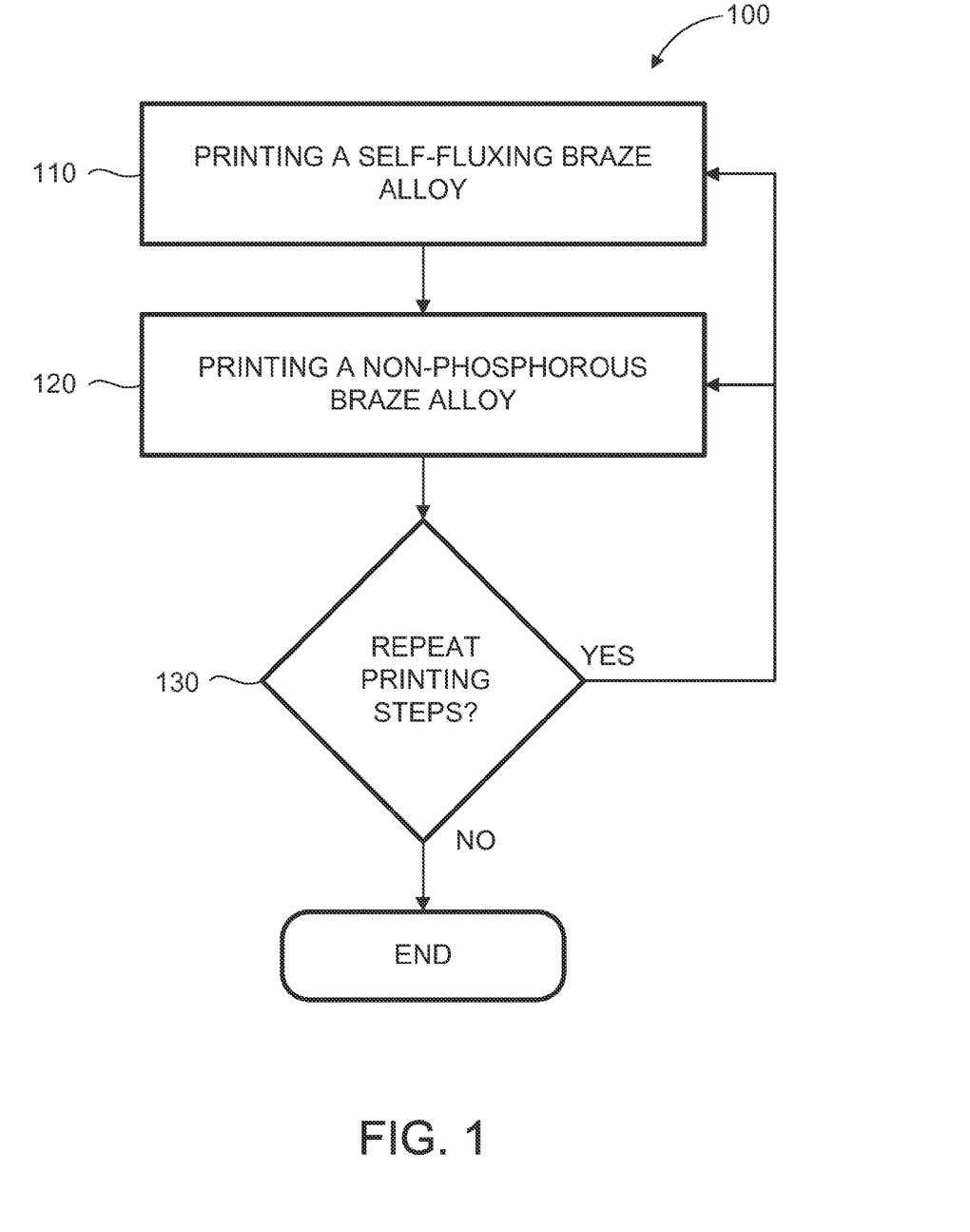
FIG. 1 illustrates a flowchart of an additive manufacturing method for manufacturing brazing preforms for turbine, turbomachinery or dynamoelectric machine components, according to an aspect of the present invention.

Referring now to FIG. 1, an additive manufacturing method 100 is illustrated for manufacturing joining preforms for turbine, turbomachinery or dynamoelectric machine components as disclosed herein. The term "joining" includes, but is not limited to brazing and soldering. Brazing is a group of joining processes that produce coalescence of materials by heating them to the brazing temperature and by using a filler metal (solder) having a liquidus above 840° F. (450° C.), and below the solidus of the base metals. Soldering has the same definition as brazing except for the fact that the filler metal used has a liquidus below 840° F. (450° C.) and below the solidus of the base metals. The invention described herein may be applied to joining, brazing and soldering.

The additive manufacturing method 100 generally comprises iteratively fusing together a plurality of layers of additive material by printing self-fluxing braze (or joining) alloy layers and non-phosphorous braze (or joining) alloy layers to form a brazing (or joining) preform. In some embodiments, the brazing/joining preform may be built/printed directly on the turbine, turbomachinery or dynamoelectric machine components.

As one example, the additive manufacturing method 100 comprises a first printing step 110 that prints a self-fluxing braze/joining alloy. The self-fluxing braze/joining alloy contains phosphorus, and the phosphorus functions as a flux.

The phosphorus helps during brazing by keeping oxygen from interfering when the braze/joining alloy initially melts and flows. However, when phosphorus is trapped in a solidified joint it may be a problem because the phosphorus increases the susceptibility of a joint to aqueous corrosion. With this in mind, the less phosphorus that can be used the better, in that the opportunity for corrosion is reduced as the amount of phosphorus is reduced. As used herein, "printing", "iteratively fusing together a plurality of layers of additive material" or "additive manufacturing" refers to any process which results in a three-dimensional object and includes a step of sequentially forming the shape of the object one layer at a time. A second printing step 120 prints a non-phosphorous braze/joining alloy on the self-fluxing braze/joining alloy. Steps 110 and 120 may be repeated (step 130) until the non-phosphorous braze/joining alloy is substantially encapsulated by the self-fluxing braze/joining alloy or until the desired brazing/joining preform is obtained. For example, if the brazing/joining preform requires another layer, than the additive manufacturing method 100 repeats step 110 and/or step 120. If the brazing/joining preform does not require another layer, than the additive manufacturing method 100 can conclude or optionally advance to a joining process. Both the printing steps 110 and 120 are performed by an additive manufacturing process.

Additive manufacturing processes include, but are not limited to, powder bed additive manufacturing and powder fed additive manufacturing processes such as by using lasers or electron beams for iteratively fusing together the powder material. Additive manufacturing processes can include, for example, three dimensional printing, laser engineering net shaping (LENS), direct metal laser sintering (DMLS), direct metal laser melting (DMLM), selective laser sintering (SLS), plasma transferred arc, freeform fabrication (FFF), and the like. One exemplary type of additive manufacturing process uses a laser beam to fuse (e.g., sinter or melt) a powder material (e.g., using a powder bed process). Additive manufacturing processes can employ powder materials or wire as a raw material. Moreover additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially fused (e.g., sintered or melted) to solidify the layer.

The additive material fused together can comprise a variety of different potential materials that can depend on, for example, the type of additive manufacturing method and/or the specific application for the brazing preform. For example, the additive material can comprise any material that may be fused (e.g., sintered) by a laser beam or other energy source. In some embodiments, the additive material can comprise a powder metal. Such powder metals can include, by non-limiting example, cobalt-chrome alloys, copper alloys, nickel alloys, tin alloys, silver alloys, aluminum and its alloys, titanium and its alloys, nickel and its alloys, stainless steels, tantalum, niobium or combinations thereof.

Figure 2:
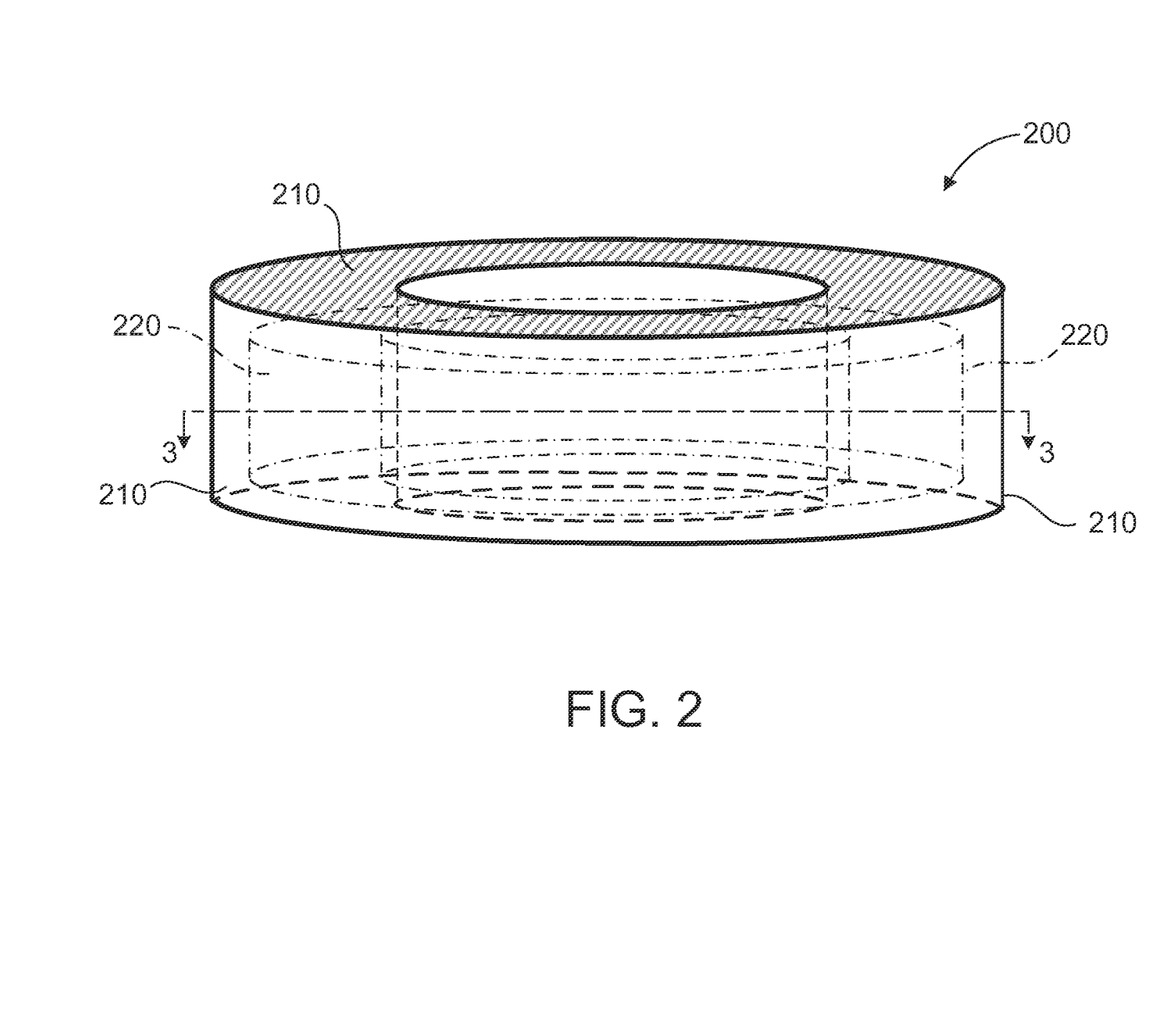
FIG. 2 illustrates a brazing preform fabricated by the additive manufacturing method of FIG. 1, according to an aspect of the present invention.

FIG. 2 illustrates a brazing/joining preform 200 fabricated by an additive manufacturing process, according to an aspect of the present invention. The brazing preform 200 is in the form of a cylinder or a washer, and includes an outer self-fluxing braze/joining alloy layer 210 and an inner non-phosphorous braze/joining alloy layer 220. The inner non-phosphorous braze alloy layer 220 may be substantially or totally encapsulated by the self-fluxing braze alloy layer 210. As examples only, the self-fluxing braze alloy 210 may be comprised of a BCuP alloy, a CuP alloy, a CuSnP alloy, a CuSnNiP alloy, a CuAgP alloy, phosphorus, boron, fluorine, chlorine, potassium or any other suitable self-fluxing braze/joining material or alloy. As a further example, the non-phosphorous braze alloy 220 may be a BAg alloy, such as BAg-8, BAg-18 or BAg-24, a BNi alloy, a BAu alloy, or any other suitable non-phosphorous braze/joining alloy. The BAg-18 alloy is comprised of silver (Ag), copper (Cu) and tin (Sn), and has a melting point of at about 1,115° F., has a liquidus temperature of about 1,325° F., and is typically brazed at temperatures above 1,325° F. A Bag-24 alloy may also be used as a non-phosphorous braze alloy, and is comprised of silver (Ag), copper (Cu), zinc (Zn) and nickel (Ni), and has a melting point of about 1,220° F. and a liquidus temperature of about 1,305° F.

Figure 3:
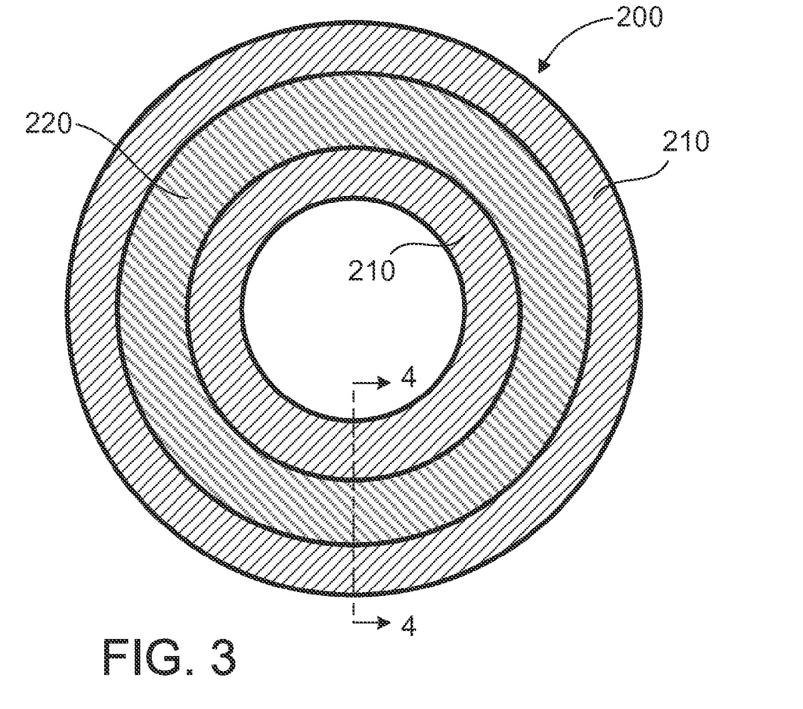
FIG. 3 illustrates a cross-sectional view of the brazing preform of FIG. 2 along sectional line 3-3, according to an aspect of the present invention.
Figure 4:
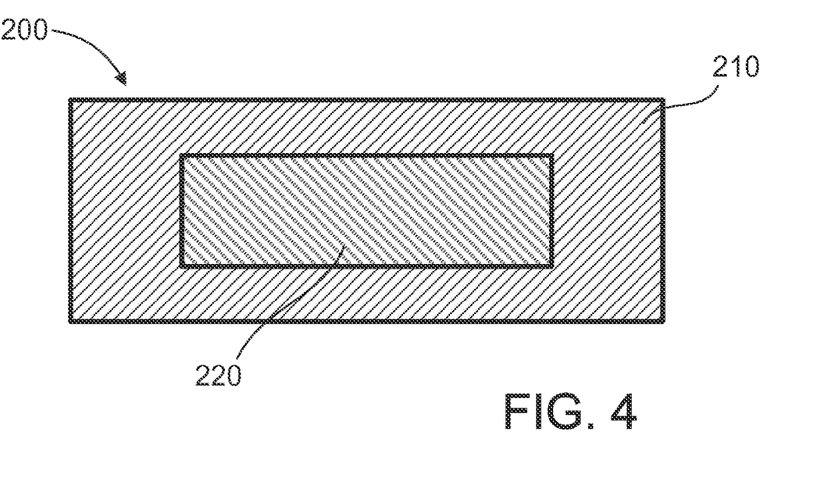
FIG. 4 illustrates a cross-sectional view of the brazing preform of FIG. 2 along sectional line 4-4 of FIG. 3, according to an aspect of the present invention.

FIG. 3 illustrates a cross-sectional view of the brazing/joining preform 200 along sectional line 3-3 of FIG. 2. The non-phosphorous braze alloy 220 is located in the center of the brazing preform 200. The self-fluxing braze alloy 210 surrounds and may substantially encapsulate the non-phosphorous braze alloy 220. FIG. 4 illustrates a cross-sectional view of the brazing preform 200 along sectional line 4-4 of FIG. 3. It can be seen that the non-phosphorous braze alloy 220 is surrounded by the self-fluxing braze alloy 210, and this exposes the phosphorus containing self-fluxing braze alloy 210 to all exterior surfaces of the brazing preform 200.

Figure 5:
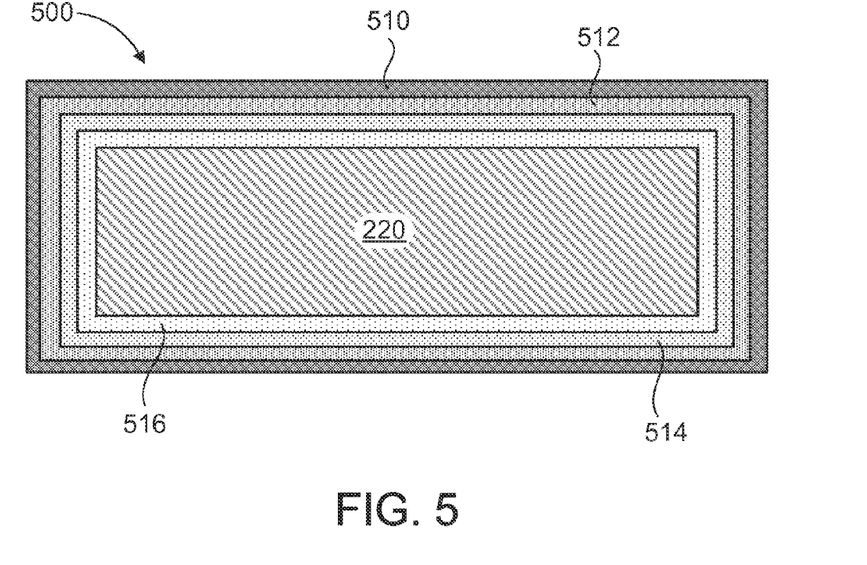
FIG. 5 illustrates a cross-sectional view of a brazing preform, according to an aspect of the present invention.

FIG. 5 illustrates a cross-sectional view of a brazing/joining preform 500, similar to the view of FIG. 4. The brazing preform 500 has a central portion comprised of a non-phosphorous braze alloy 220, which is similar to that shown in FIGS. 1-4. However, the self-fluxing braze alloy is printed in multiple layers 510, 512, 514, 516. Each of the layers 510, 512, 514, 516 may have a different percentage of phosphorus or other constituent elements, and each layer may also have a different melting point. As one example only, self-fluxing braze alloy layer 510, the outermost layer, may be comprised of BCuP-5, which is 15% silver (Ag), 80% copper (Cu) and 5% phosphorus (P). The next layer 512 may be a BCuP layer that has only 3% phosphorus, followed by layer 514 that is a BCuP layer that has only 2% phosphorus and finally layer 516 is a BCuP layer that has only 1% phosphorus. In this example, the outer layers have a higher percentage of phosphorus than the inner layers. The layers 510, 512, 514, 516 may gradually or drastically increase or decrease the percentage of phosphorus as they progress inward towards the non-phosphorous braze alloy 220. This configuration puts phosphorus only where it is needed, on the exterior portions that will come in contact with oxygen. The overall braze preform 500 has reduced levels of phosphorus and the potential for future joint corrosion is greatly reduced. As another example, layer 510 may be the only layer that contains phosphorus. Alternatively, the outer layers may have a lower percentage of phosphorus than the inner layers. The percentage change of phosphorus may also linearly or exponentially change across the various layers.

The self-fluxing braze alloy layers 510, 512, 514, 516 may have different melting points as well. For example, layer 510 may have a melting point of at about 1,190° F., and a liquidus temperature of about 1,300° F., layer 512 may have a melting point of at about 1,180° F., and a liquidus temperature of about 1,290° F., layer 514 may have a melting point of at about 1,170° F., and a liquidus temperature of about 1,280° F., and layer 516 may have a melting point of at about 1,160° F., and a liquidus temperature of about 1,270° F. In this example the outer layers (510, 512) have a higher melting point than the melting point of the inner layers (514, 516). The layers 510, 512, 514, 516 may be configured to have increasing or decreasing melting points, and more or less that four layers can be employed, as desired in the specific application.

Figure 6:
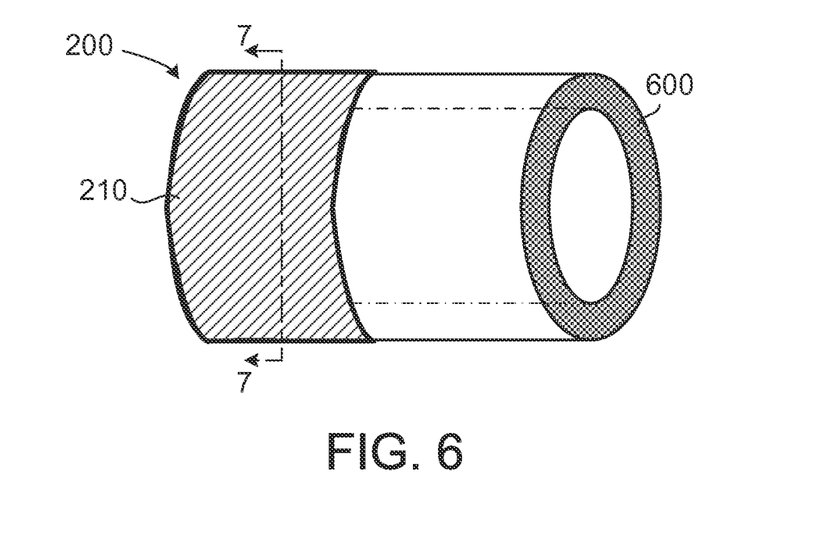
FIG. 6 illustrates a perspective view of a brazing preform printed on a part to be brazed, according to an aspect of the present invention.
Figure 7:
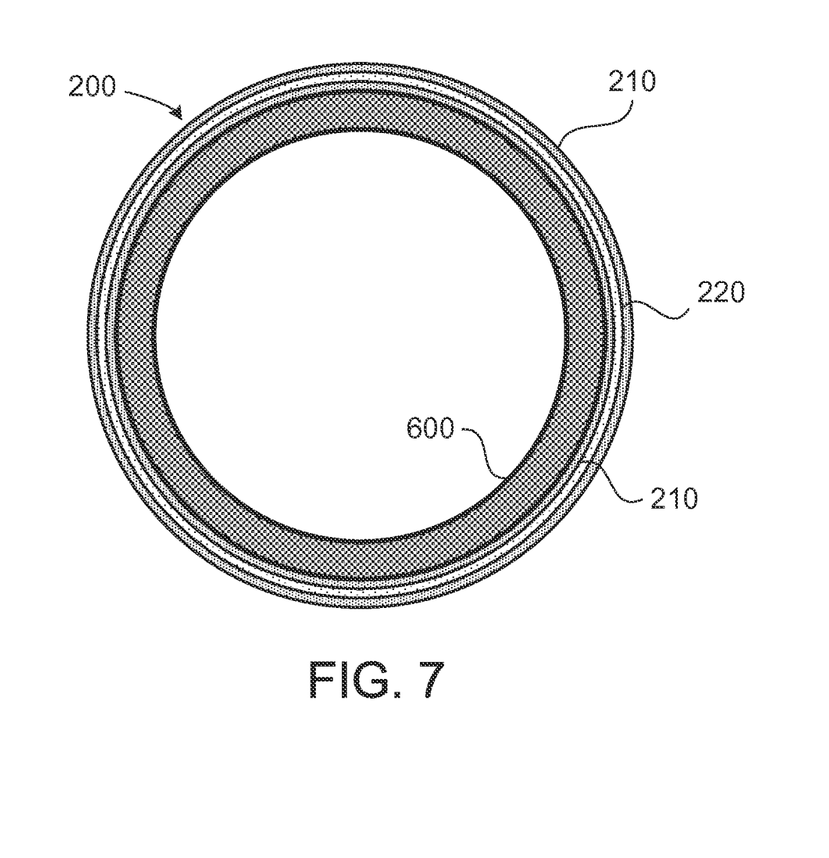
FIG. 7 is a cross-sectional view of the part and brazing preform along sectional line 7-7 as shown in FIG. 6, according to an aspect of the present invention.

FIG. 6 illustrates a perspective view of a brazing preform 200 printed on a part 600 to be brazed/joined, according to an aspect of the present invention. The part 600 may be a pipe or fitting and the brazing preform 200 is printed, layer-by-layer, on the part 600. The part 600 may be any part or component of a turbomachine or dynamoelectric machine that needs to be brazed. FIG. 7 is a cross-sectional view along sectional line 7-7, as shown in FIG. 6. The braze preform 200 has an inner self-fluxing braze alloy layer 210 in contact with the part 600, a middle non-phosphorous brazing alloy layer 220 and an outer self-fluxing braze alloy layer 210.

Upon application of sufficient heat, the three braze alloy layers 210, 220 and 210 all melt. The phosphorus-bearing layers 210 in contact with the copper part, self-flux during brazing and give good adhesion to the parts. The phosphorus-free layer 220 in between dilutes the phosphorus-rich layers 210 to minimize the residual presence of $Cu_3P$ phase in the joint, which is a metallurgical phase that can serve as a site for corrosive attack. The resulting brazed joint provides enhanced corrosion protection at the point of contact with flowing fluid (e.g., cooling water, or any cooling medium).

Figure 8:
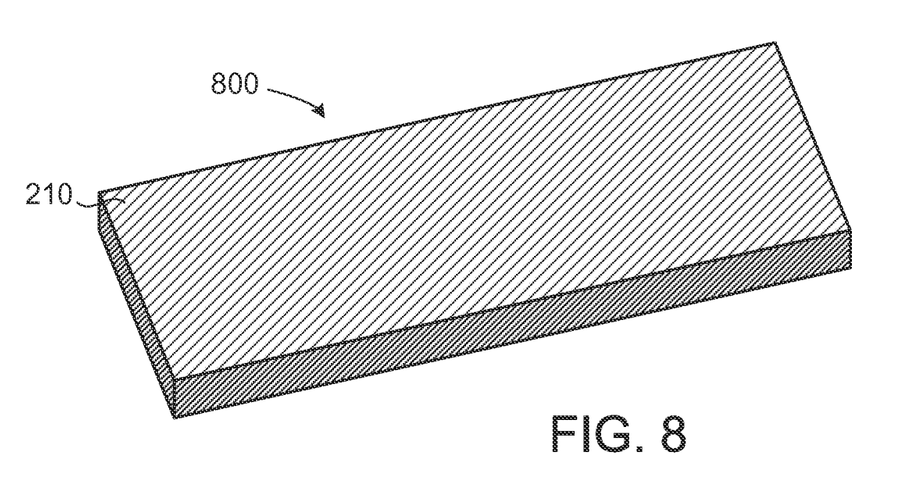
FIG. 8 is a perspective view of a brazing preform in the form of a sheet, according to an aspect of the present invention.
Figure 9:
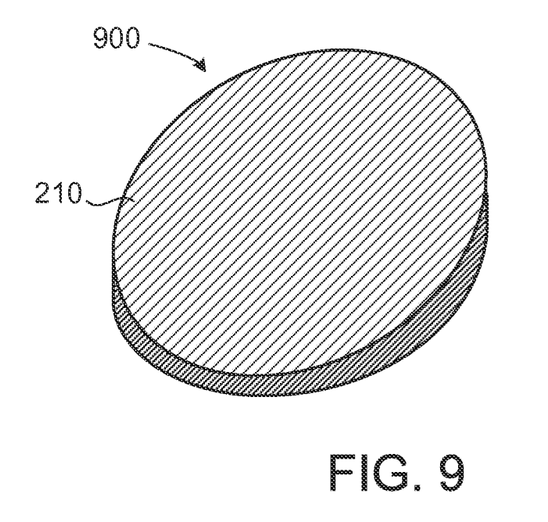
FIG. 9 is a perspective view of a brazing preform in the form of a disc.

FIG. 8 is a perspective view of a brazing/joining preform 800 in the form of a sheet. The outer layer is a self-fluxing braze alloy 210. An inner layer (not shown) may be formed of a non-phosphorous braze alloy 220. FIG. 9 is a perspective view of a brazing/joining preform 900 in the form of a disc. The outer layer is a self-fluxing braze alloy 210. An inner layer (not shown) may be formed of a non-phosphorous braze alloy 220.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of fabricating a joining preform, the method comprising:
   printing a self-fluxing joining alloy, the self-fluxing joining alloy containing at least one of phosphorus, boron, fluorine, chlorine, or potassium, the printing a self-fluxing joining alloy step comprising printing multiple layers of the self-fluxing joining alloy, each of the layers having a different percentage of phosphorus;
   printing a non-phosphorous joining alloy;
   repeating the printing a self-fluxing joining alloy step until the non-phosphorous joining alloy is substantially encapsulated by the self-fluxing joining alloy; and
   wherein both printing steps are performed by an additive manufacturing process.

2. The method of claim 1, wherein the self-fluxing joining alloy is at least one of: a BCuP alloy, a CuP alloy, a CuSnP alloy, a CuSnNiP alloy or a CuAgP alloy.

3. The method of claim 1, wherein the non-phosphorous joining alloy is at least one of a BAg alloy, a BNi alloy, or a BAu alloy.

4. The method of claim 1, the printing a self-fluxing joining alloy step further comprising:
   printing the self-fluxing joining alloy on a part to be joined.

5. The method of claim 1, wherein the joining preform is formed into at least one of:
   a cylinder, a disc, a sheet or a washer.

6. The method of claim 1, the multiple layers comprised of a plurality of inner layers and a plurality of outer layers; and
   wherein the outer layers have a different percentage of phosphorus than the inner layers.

7. The method of claim 1, the multiple layers comprised of a plurality of inner layers and a plurality of outer layers; and
   wherein the outer layers have a different melting point than a melting point of the inner layers.

8. A method of fabricating a joining preform, the method comprising:
   printing a non-phosphorous joining alloy;
   printing a self-fluxing joining alloy on the non-phosphorous joining alloy, the self-fluxing joining alloy containing at least one of phosphorus, boron, fluorine, chlorine, or potassium, the printing a self-fluxing joining alloy step comprising printing multiple layers of the self-fluxing joining alloy, each of the layers having a different percentage of phosphorus; and
   wherein both printing steps are performed by an additive manufacturing process.

9. The method of claim 8, wherein the self-fluxing joining alloy is at least one of a BCuP alloy, a CuP alloy, a CuSnP alloy, a CuSnNiP alloy or a CuAgP alloy.

10. The method of claim 9, wherein the non-phosphorous joining alloy is at least one of a BAg alloy, a BNi alloy, or a BAu alloy.

11. The method of claim 9, the printing a non-phosphorous joining alloy step further comprising:
    printing the non-phosphorous joining alloy on a part to be joined.

12. The method of claim 9, wherein the joining preform is formed into at least one of:
    a cylinder, a disc, a sheet or a washer.

13. The method of claim 8, the multiple layers comprised of a plurality of inner layers and a plurality of outer layers; and
    wherein the outer layers have a higher percentage of phosphorus than the inner layers.

14. The method of claim 8, the multiple layers comprised of a plurality of inner layers and a plurality of outer layers; and
    wherein the outer layers have a different melting point than a melting point of the inner layers.

15. A method of fabricating a brazing preform, the method comprising:
    printing a self-fluxing braze alloy, the self-fluxing braze alloy containing phosphorus, the self-fluxing braze alloy is at least one of a BCuP alloy, a CuP alloy, a CuSnP alloy, a CuSnNiP alloy or a CuAgP alloy, the printing a self-fluxing braze alloy step comprising printing multiple layers of the self-fluxing braze alloy, each of the layers having a different percentage of phosphorus;

printing a non-phosphorous braze alloy, the non-phosphorous braze alloy is a BAg alloy;

repeating the printing a self-fluxing braze alloy step until the non-phosphorous braze alloy is substantially encapsulated by the self-fluxing braze alloy; and wherein both printing steps are performed by an additive manufacturing process, and the brazing preform is formed into at least one of a cylinder, a disc, a sheet or a washer.

16. The method of claim 15, the printing a self-fluxing braze alloy step further comprising:

printing the self-fluxing braze alloy on a part to be brazed.

17. The method of claim 15, the multiple layers comprised of a plurality of inner layers and a plurality of outer layers, the outer layers having a different percentage of phosphorus than the inner layers, and the outer layers having a different melting point than the inner layers.

18. A method of fabricating a joining preform, the method comprising:

printing a self-fluxing alloy in multiple layers, the self-fluxing alloy containing phosphorus, at least some of the layers having a different percentage of phosphorus;

printing a non-phosphorous alloy;

repeating the printing a self-fluxing alloy step until the non-phosphorous alloy is substantially encapsulated by the self-fluxing alloy; and wherein both printing steps are performed by an additive manufacturing process.

19. The method of claim 18, the multiple layers comprised of a plurality of inner layers and a plurality of outer layers; and wherein the outer layers have a different percentage of phosphorus than the inner layers, or the outer layers have a different melting point than a melting point of the inner layers.

20. The method of claim 18, wherein the self-fluxing alloy is at least one of a BCuP alloy, a CuP alloy, a CuSnP alloy, a CuSnNiP alloy or a CuAgP alloy, and the non-phosphorous alloy is at least one of a BAg alloy, a BNi alloy, or a BAu alloy.

* * * * *